US006679697B2

(12) United States Patent
Bouti

(10) Patent No.: US 6,679,697 B2
(45) Date of Patent: Jan. 20, 2004

(54) FLOW DETECTOR APPARATUS

(75) Inventor: Abdeslam Bouti, Swanton, VT (US)

(73) Assignee: Husky Injection Molding Systems Ltd., Bolton (CA)

( * ) Notice: Subject to any disclaimer, the term of this patent is extended or adjusted under 35 U.S.C. 154(b) by 235 days.

(21) Appl. No.: 09/733,349

(22) Filed: Dec. 8, 2000

(65) Prior Publication Data

US 2002/0071888 A1 Jun. 13, 2002

(51) Int. Cl.[7] .............................................. B29C 45/23
(52) U.S. Cl. ...................... 425/130; 425/564; 425/566
(58) Field of Search ............................... 425/130, 562, 425/563, 564, 565, 566

(56) References Cited

U.S. PATENT DOCUMENTS

| | | | |
|---|---|---|---|
| 4,268,240 A | 5/1981 | Rees et al. | 425/548 |
| 4,303,382 A | 12/1981 | Gellert | 425/566 |
| 4,433,969 A | 2/1984 | Gellert | 425/564 |
| 4,443,178 A | 4/1984 | Fujita | 425/564 |
| 4,705,473 A | 11/1987 | Schmidt | 425/549 |
| 4,932,858 A | 6/1990 | Gellert | 425/564 |
| 5,334,010 A | 8/1994 | Teng | 425/563 |
| 5,518,393 A | 5/1996 | Gessner | 425/549 |
| 5,834,041 A | 11/1998 | Sekine et al. | 425/549 |
| 5,849,343 A | 12/1998 | Gellert et al. | 425/549 |
| 5,891,381 A * | 4/1999 | Bemis et al. | 425/564 |

FOREIGN PATENT DOCUMENTS

| | | |
|---|---|---|
| DE | 2259818 | 7/1974 |
| EP | 0 374 346 B1 | 5/1993 |
| JP | 62-35818 | 2/1987 |

OTHER PUBLICATIONS

Hot Sys C., Ltd. Marketing Brochure distributed at NPE show in Chicago in Jun. 2000 showing value pin guide and nozzle body.

Mold Masters article entitled "Color Change in Hot Runner Systems" Feb. 1996.

Incoe Corporation article entitled "Co–Injection Systems" located at http://www.incoe.com.

Helmy, Hassan, "Aspects of the Design of Coathanger Dies for Cast Film and Sheet Applications"; Advances in Polymer Technology, vol. 7, No. 1, pp. 59–69 (1987).

"Analysis for Extrusion Die Design" by B. Proctor, SPE ANTEC, Washington DC pp. 211–218 (1971).

"Extrusion Dies for Plastics and Rubber" by W. Michaeli, Carl Hanser Verlag, Munich ISBN 3–446–16190–2 173–175.

* cited by examiner

*Primary Examiner*—Tim Heitbrink
(74) *Attorney, Agent, or Firm*—Katten Muchin Zavis Rosenman

(57) ABSTRACT

A flow deflector apparatus and method in an injection molding system which transitions a flowing medium around an obstruction, said flowing medium exhibiting reduced stagnation points and substantially uniform flow characteristics downstream of the obstruction.

17 Claims, 10 Drawing Sheets

FLOW DETECTOR APPARATUS

BACKGROUND OF THE INVENTION

1. Field of the Invention

This invention relates to an apparatus and method for converting the circular flow inside a melt channel to a uniform annular flow. More specifically, this invention relates to an apparatus and method for improving uniform melt flow and elimination of stagnation points as it passes through an injection molding machine and/or hot runner system.

2. Summary of the Prior Art

The large number of variables in the injection molding process creates serious challenges to creating a uniform and high quality part. These variables are significantly compounded within multi-cavity molds. Here we have the problem of not only shot to shot variations but also variations existing between individual cavities within a given shot. Shear induced flow imbalances occur in all multi-cavity molds that use the industry standard multiple cavity "naturally balanced" runner system whereby the shear and thermal history within each mold is thought to be kept equal regardless of which hot-runner path is taken by the molten material as it flows to the mold cavities. These flow imbalances have been found to be significant and may be the largest contributor to product variation in multi-cavity molds.

Despite the geometrical balance, in what has traditionally been referred to as "naturally balanced" runner systems, it has been found that these runner systems can induce a significant variation in the melt conditions delivered to the various cavities within a multi-cavity mold. These variations can include melt temperature, pressure, and material properties. Within a multi-cavity mold, this will result in variations in the size, shape and mechanical properties of the product.

It is well known that providing for smooth flow of pressurized melt is critical to successful molding of certain materials. Sharp bends, corners or dead spots in the melt passage results in unacceptable residence time for some portion of the melt being processed which can cause too much delay on color changes and/or result in decomposition of some materials or pigments of some materials such as polyvinyl chloride and some polyesters or other high temperature crystalline materials. In most multi-cavity valve gated injection molding systems it is necessary for the melt flow passage to change direction by 90° and to join the bore around the reciprocating valve stem as it extends from the manifold to each nozzle.

These problems necessarily require fine tolerance machining to overcome and it is well known to facilitate this by providing a separate bushing seated in the nozzle as disclosed in U.S. Pat. No. 4,026,518 to Gellert. A similar arrangement for multi-cavity molding is shown in U.S. Pat. No. 4,521,179 to Gellert. U.S. Pat. No. 4,433,969 to Gellert also shows a multi-cavity arrangement in which the bushing is located between the manifold and the nozzle. Also shown in U.S. Pat. No. 4,705,473 to Schmidt, provides a bushing in which the melt duct in the bushing splits into two smoothly curved arms which connect to opposite sides of the valve member bore. U.S. Pat. No. 4,740,151 to Schmidt, et al. shows a multi-cavity system with a different sealing and retaining bushing having a flanged portion mounted between the manifold and the back plate.

U.S. Pat. No. 4,443,178 to Fujita discloses a simple chamfered surface located behind the valve stem for promoting the elimination of the stagnation point which would otherwise form.

U.S. Pat. No. 4,932,858 to Gellert shows a separate bushing seated between the manifold and the injection nozzle in the melt stream which comprises a melt duct with two smoothly curved arms which connect between the melt passage in the manifold and the melt passage around the valve stem in an effort to eliminate the stagnation points.

Another valve nozzle device has also been known, the device having a number of valve nozzles as shown in FIGS. 7 and 8. The plastic resin is passed through a first passageway 30 and then passed through a second passage 30a extending substantially at right angles with respect to the first passage 30 into valve chambers and then injected into metal molds through nozzles (not shown). Needle valve 32 is provided adjacent to the nozzle.

With the above described construction of the conventional multi-valve nozzle device, since the second passage 30a extending substantially at right angles with respect to the first passage 30 is in a plane including the needle valve 32, resin is caused to stagnate at positions P1 and P2 as shown in FIGS. 7 and 8. The stagnation of the plastic resin causes a pressure loss in each valve chamber as well as inhibits color change and uniform melt velocity. Although the stagnation of the plastic resin may be more or less reduced by the application of the prior art, heretofore the complete elimination of the stagnation or and resulting non-uniform annular flow has been impossible.

Reference should also be made to the following references: "Analysis for Extrusion Die Design" by B. Proctor, SPE ANTEC, Washington, D.C. pages 211–218 (1971); and "Extrusion Dies for Plastics and Rubber" by W. Michaeli, Carl Hanser Verlag, Munich, ISBN 3-446-16190-2 (1992).

There exists a need for a method and apparatus that substantially reduces the flow imbalances and stagnation points in an injection molding system and/or hot runner system that occurs as a result of the flow being diverted around a melt flow obstruction such as a valve stem, a nozzle, a nozzle tip, a valve stem guide, a torpedo, etc.

SUMMARY OF THE INVENTION

A flow deflector in a melt channel, preferably around a valve stem or other flow obstruction, where the melt flow is converted from circular flow to annular flow. The deflector comprises a cylindrical body with a gradually expanding channel disposed on its outer surface. The channel is such that a first and second wall of the channel form two symmetrical inverted funnel-shaped cavities as the melt travels down the cylindrical body. The walls of the channel are designed to have substantially the same length in the direction the melt travels. In this arrangement, the melt flow is constricted on the near side of the flow as it travels around the cylindrical body which in turn promotes the flow around the back of the cylindrical body. Promoting the flow around the back of the cylindrical body helps to "wash-out" any stagnation points whilst also promoting a uniform annular flow rate as the melt exits the large end of the channel.

DETAILED DESCRIPTION OF THE PREFERRED EMBODIMENTS

Figure 1:
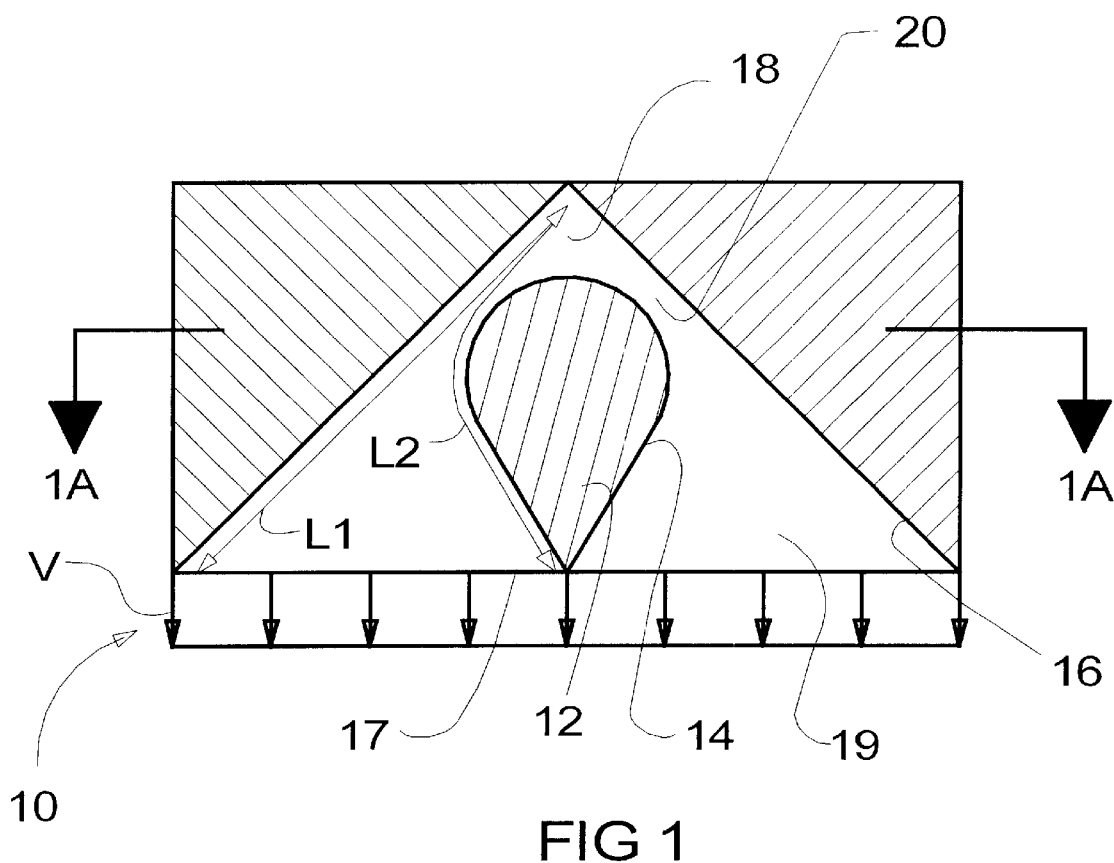
FIGS. 1 and 1A are simplified views showing the basic principle of a side-fed mandrel die.
Figure 1A:
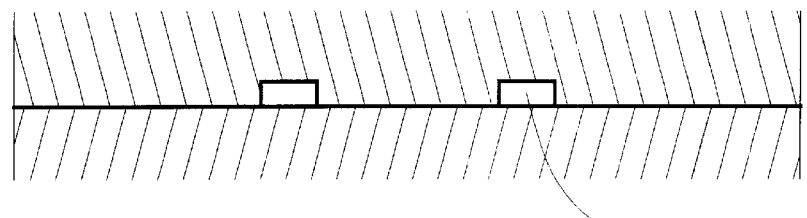

Referring first to FIGS. 1 and 1A, a simplified flat construction is shown which depicts the basic principles behind the present invention. Similar to side fed mandrel die principles, the melt flow will enter at a predetermined angle to a flow deflector 10 at a flow inlet 18. The melt flow will split and travel around a torpedo 12 and between a torpedo wall 14 and an outside wall 16, the cavity therein forming an inverted funnel channel 19. Funnel channel 19 is defined by a constriction 20 adjacent flow inlet 18 which increases in cross-section as the flow travels towards an exit 17 of funnel channel 19. As shown in FIG. 1A, a pair of balanced cavities 22 exhibiting equal cross-sectional area is formed on the sides of torpedo 12. In an effort to create a uniform flow rate V as the melt reaches exit 17, the length of torpedo wall 14 (shown as L2) and outside wall 16 (shown as L1) are substantially equal.

Figure 2:
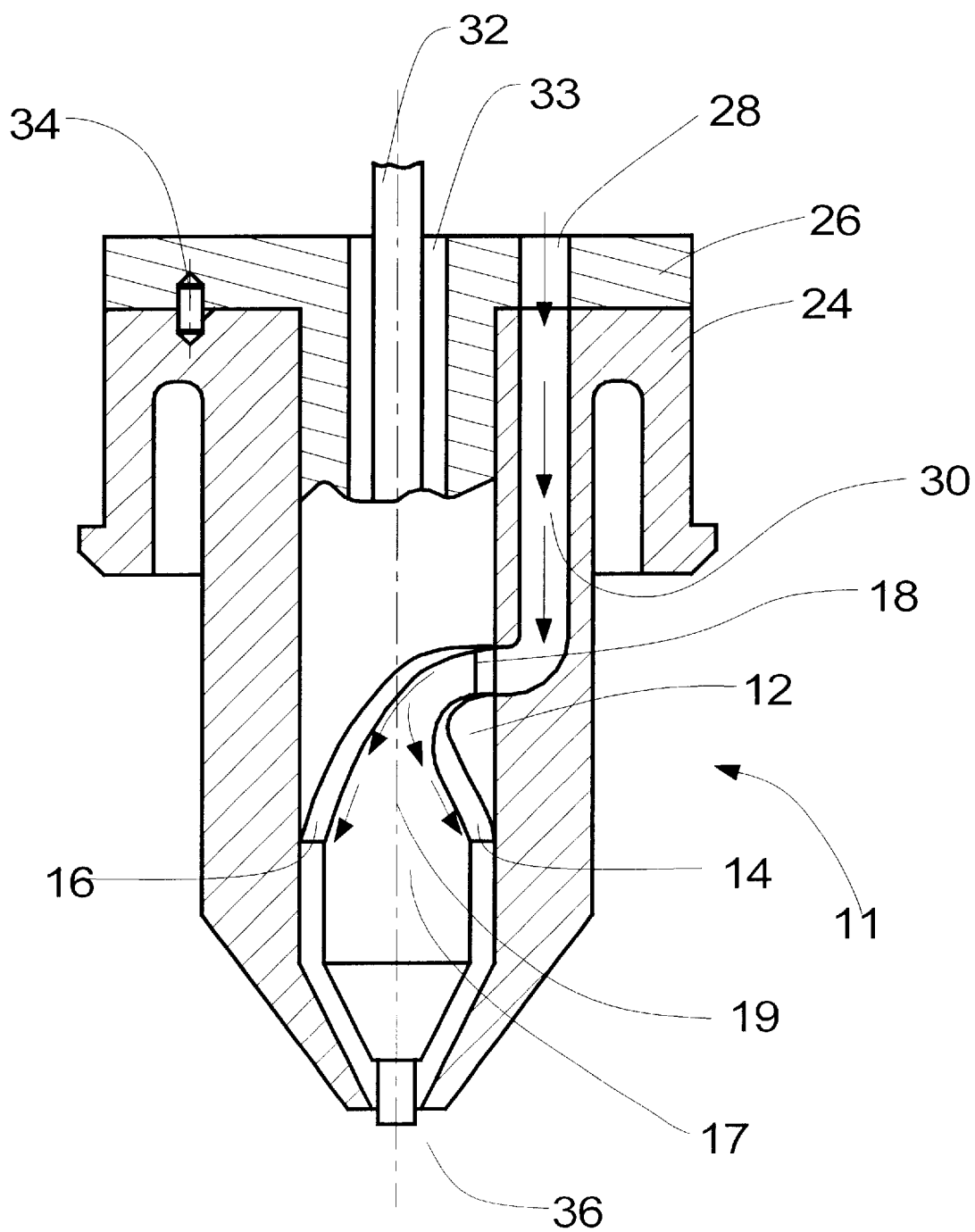
FIG. 2A is a simplified isometric view of a preferred embodiment of the present invention.
FIG. 2B is a partial sectional view of another preferred embodiment of the present invention in a co-injection nozzle comprising two melt flow inlets.
Figure 2A:
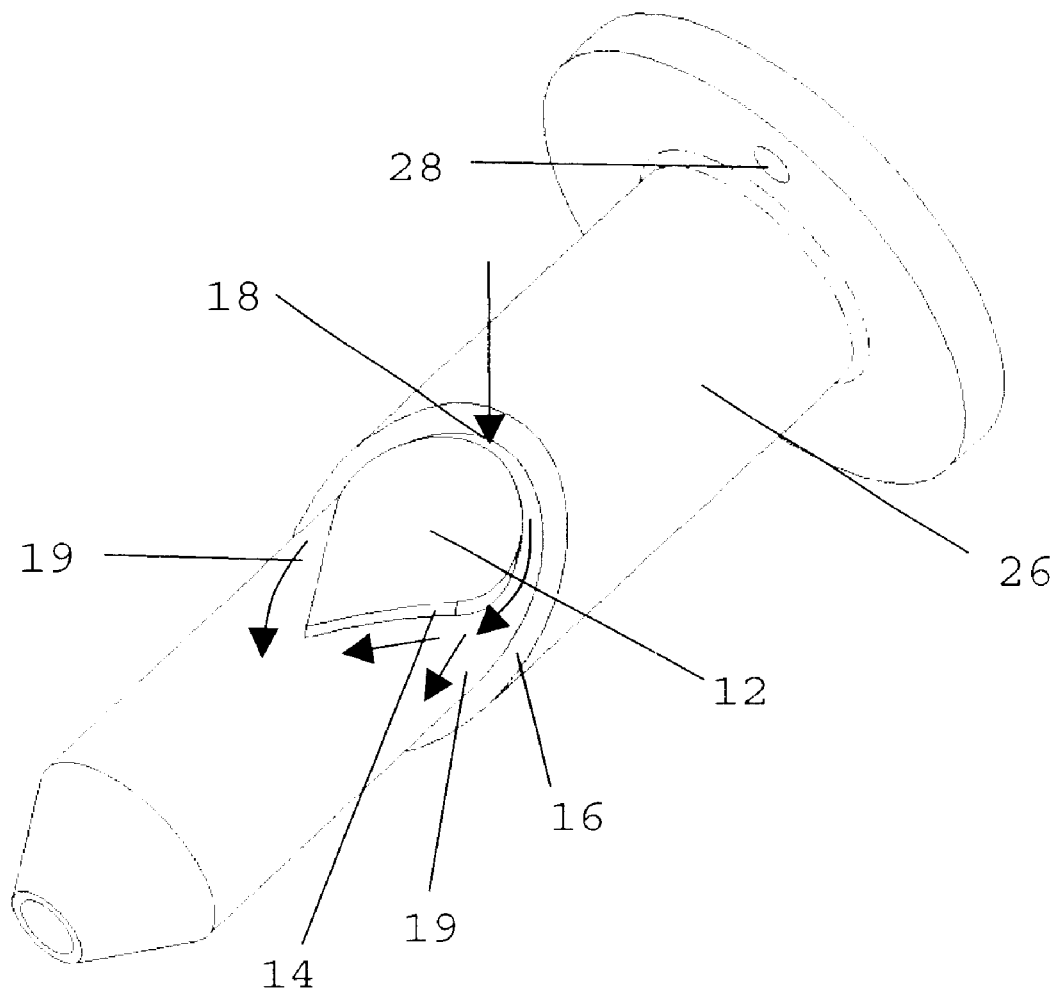
Figure 2B:
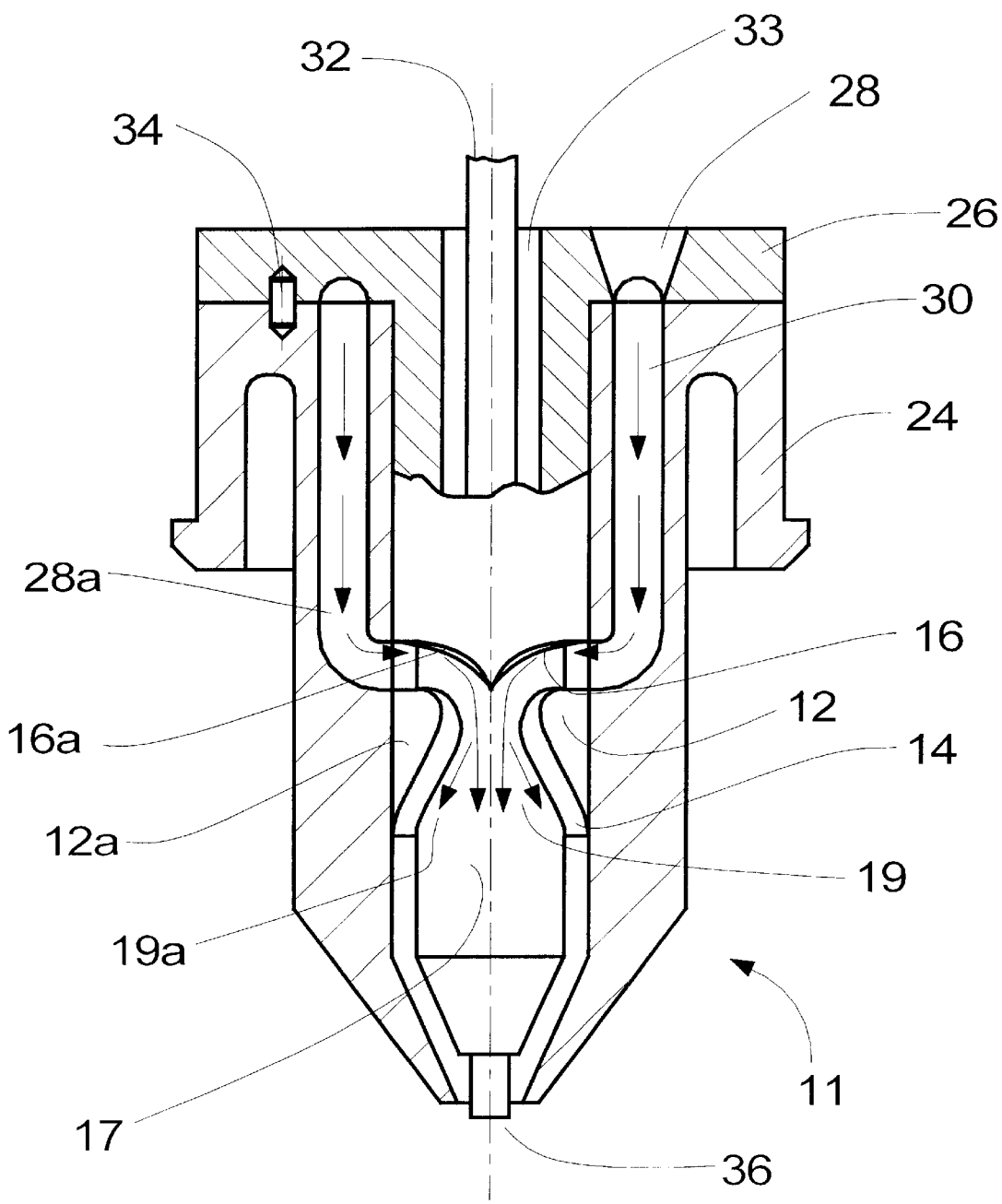

Now referring to FIGS. 2, 2A and 2B, a co-injection hot runner nozzle 11 according to a preferred embodiment of the present invention is generally shown. This preferred embodiment is comprised of the device as shown in FIG. 1, which has been wrapped around the circumference of a deflector body 26. Deflector body 26 is inserted into a nozzle body 24 and aligned with a second melt passage 30 such that the melt enters the flow inlet 18 substantially perpendicular to deflector body 26. This alignment is fixed by a locating pin 34. Locating pin 34 could be any suitable alignment means known in the art including (but not limited to) screws, rivets, spring pins, dowel pins, etc. Deflector body 26 further comprises a first melt passage 28 which is aligned with second melt passage 30 for communication of a first melt from an injection molding machine (not shown) or hot runner manifold (also not shown).

A valve stem 32 extends through a third melt passage 33 that is located inside of and runs the length of deflector body 26. Third melt passage 33 is provided to communicate the flow of a second melt into the mold cavity. Valve stem 32, as well known in the art, is selectively positioned through an up and down motion to start and stop the flow of the two melt streams through a nozzle outlet 36, thereby controlling the filling of the mold cavity. In this arrangement, popularly known as co-injection, a mold cavity may be filled with two or more different melts for effects such as multiple colors, different melt materials and the like.

As the melt flows from second melt passage 30 to flow inlet 18, it strikes the outside wall of the deflector body 26 substantially perpendicular to valve stem 32 longitudinal axis (However, non-perpendicular flow impingement could easily be accomplished). If torpedo 12 and outside wall 16 were not present, the melt would tend to flow down along the face of deflector body 26 closest to flow inlet 18, thereby causing stagnation points behind deflector body 26. However, in this preferred embodiment, the melt flow impinges on torpedo wall 14 and outside wall 16 thereby causing the flow to be diverted through funnel channel 19 and around the back of deflector body 26. Torpedo 12 and outside walls thereby make a diverter on the deflector body 26.

In addition, torpedo wall 14 and outside wall 16 are provided with substantially the same length, which causes the melt to flow substantially an equal distance as it travels along deflector body 26. By the time the melt reaches exit 17, the flow rate of the melt is essentially equal, thereby resulting in uniform annular flow of the melt.

In FIG. 2B, a dual inlet co-injection nozzle similar to that shown in FIG. 2 is shown. The significant difference between these two preferred embodiments is the use of an additional first melt passage 28a that is diametrically opposed to the other first melt passageway. In this embodiment, an identical torpedo 12a and outside wall 16a are provided which defines an identical and second funnel channel 19a. In this arrangement, elimination of stagnation points and the creation of a uniform annular velocity is achieved.

Figure 3:
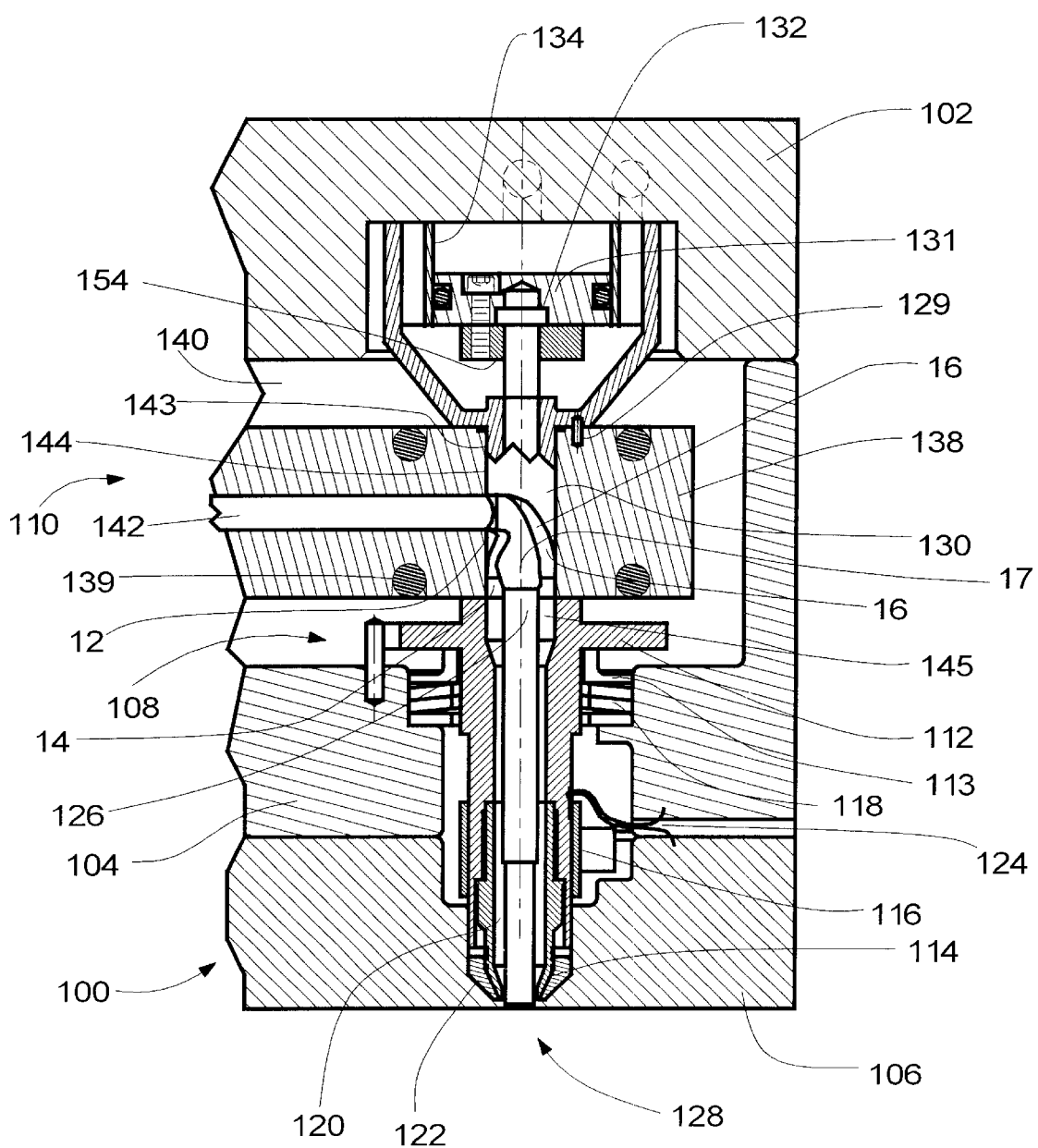
FIG. 3 is a sectional view of another preferred embodiment of the present invention comprising a valve-gated nozzle in an injection molding system.

Referring to FIG. 3 (where like features have like numerals), another preferred embodiment in accordance with the present invention is generally shown. A hot runner valve gate system 100 for injecting plastic material into a mold or the like is illustrated. The system includes a backing plate 102 and a manifold plate 104. The system further includes a nozzle assembly 108 for introducing molten plastic material into a mold (not shown) and a manifold/bushing arrangement 110 for allowing communication of plastic material from a source (not shown) to the nozzle assembly 108. A manifold heater 139 is shown inserted in a manifold 138, thereby heating the manifold 138 which in turn heats the flowing plastic within a melt channel 142 and a deflector housing channel 144.

As shown in FIG. 3, the nozzle assembly 108 consists of a nozzle body 112, a tip 114, a nozzle heater 116, a spring means 118, and a nozzle insulator 113. The nozzle body 112 is typically made of steel, while the tip 114 may be formed from any suitable highly heat-conductive material known in the art such as beryllium/copper. The nozzle body 112 has an axial channel 120 through which molten plastic material flows. The tip 114 surrounds a terminal part of the axial channel 120.

If desired, the nozzle tip 114 may include a sheath 122 for thermally insulating the downstream end of the nozzle tip 114. The sheath 122 may be formed from a resinous material which may be prefabricated. Alternatively, the sheath 122 may be formed from an overflow of injected resin in the first operating cycle or cycles. The nozzle insulator 113 is installed within a cavity of the manifold plate 104 and acts to reduce the thermal communication between the nozzle body 112 and the manifold plate 104, thereby maintaining the high temperature of the molten plastic material as it flows through the axial channel 120. The nozzle insulator 113 may be formed from any suitable insulating material, typically known in the art such as titanium.

The nozzle heater 116 may be any suitable electric heater known in the art to which current is admitted by way of a cable 124. As shown in FIG. 3, the nozzle heater 116 surrounds a portion of the nozzle body 112.

A valve stem 126 is provided to permit opening and closing of the gate 128 in the nozzle body 112. The valve stem 126 may be formed by a steel rod that extends through a passageway in the deflector housing 130 and into the nozzle body 112. The end of the valve stem 126 opposite to the gate 128 is connected to a piston head 131 by a set-screw 154.

The piston head 131 is housed within a cylinder housing which comprises the upper distal end of deflector housing 130 and formed by cylindrical wall 134. Downstroke of the piston head 131 causes the valve stem 126 to move into a position where it closes or reduces the cross sectional area of the gate 128 so as to restrict flow of the molten plastic material. Upstroke of the piston head 131 causes the valve stem 126 to move so as to increase flow of the molten plastic material through the gate 128.

The hot runner system of this preferred embodiment also includes a manifold/deflector housing arrangement 110 consisting of the manifold 138 and the deflector housing 130 inserted therein. A locating pin 129 fixes the alignment of the deflector housing 130 to the melt channel 142. The manifold 138 is formed by a distribution plate housed between the plates 102 and 104 but separated therefrom by an air gap 140. The backing plate 102 is rigidly affixed to the manifold plate 104 by a plurality of high strength bolts (not shown) which must withstand the large tensile forces generated during the cyclic molding process.

The manifold includes the melt channel 142 forming part of the hot runner system for transporting molten plastic material from a source (not shown) to the gate 128 associated with a respective mold or molds. The manifold further includes a bore 143 into which deflector housing 130 is inserted. The manifold 138 may be formed from any suitable metal or heat conducting material known in the art. The manifold heater 139 is well known in the art and typically comprises a wire/ceramic resistive type heater with a cylindrical cross section that is seated into a groove of the manifold 138.

The deflector housing 130 guides a portion of the valve stem 126. This is an important advantage of the present invention because this increased valve stem support reduces valve stem wear and will significantly increase the life of the valve stem. Increased valve stem life will result in reduced maintenance costs and machine downtime.

The deflector housing 130 is formed from any suitable material known in the art (usually steel) and is designed to be inserted into the manifold 138 from the top. As shown in FIG. 3, the deflector housing channel 144 mates with the melt channel 142 in the manifold 138 and the axial channel 120 in the nozzle assembly 108.

Similar to the embodiments already discussed, the deflector housing 130 further comprises a torpedo 12 and an outside wall 16 which acts to divert the flow around the corner and behind the valve stem 126. The melt flow enters the deflector housing channel 144 and is immediately diverted between the torpedo 12 and the outside wall 16 which is shaped to form an inverted funnel channel 19. The torpedo wall 14 is designed to have substantially the same length as outside wall 16 so that by the time the melt reaches exit 17, the melt flow exhibits a substantially uniform annular flow velocity. In this arrangement, the melt navigates both a 90 degree change in direction and splits around an obstacle, for example the valve stem 126 or the deflector housing 130, without creating flow imbalances that adversely affect the molded part quality. In addition, stagnation points, which normally form behind valve stem 126, have been eliminated by directing the melt to flow around to the back of the valve stem 126.

It should be noted that even though the preceding embodiments describe a deflector housing 26 (FIG. 2) that is separate from the nozzle body 24 (FIG. 2), a single bushing could easily be fabricated that incorporates all the required features.

Figure 4:
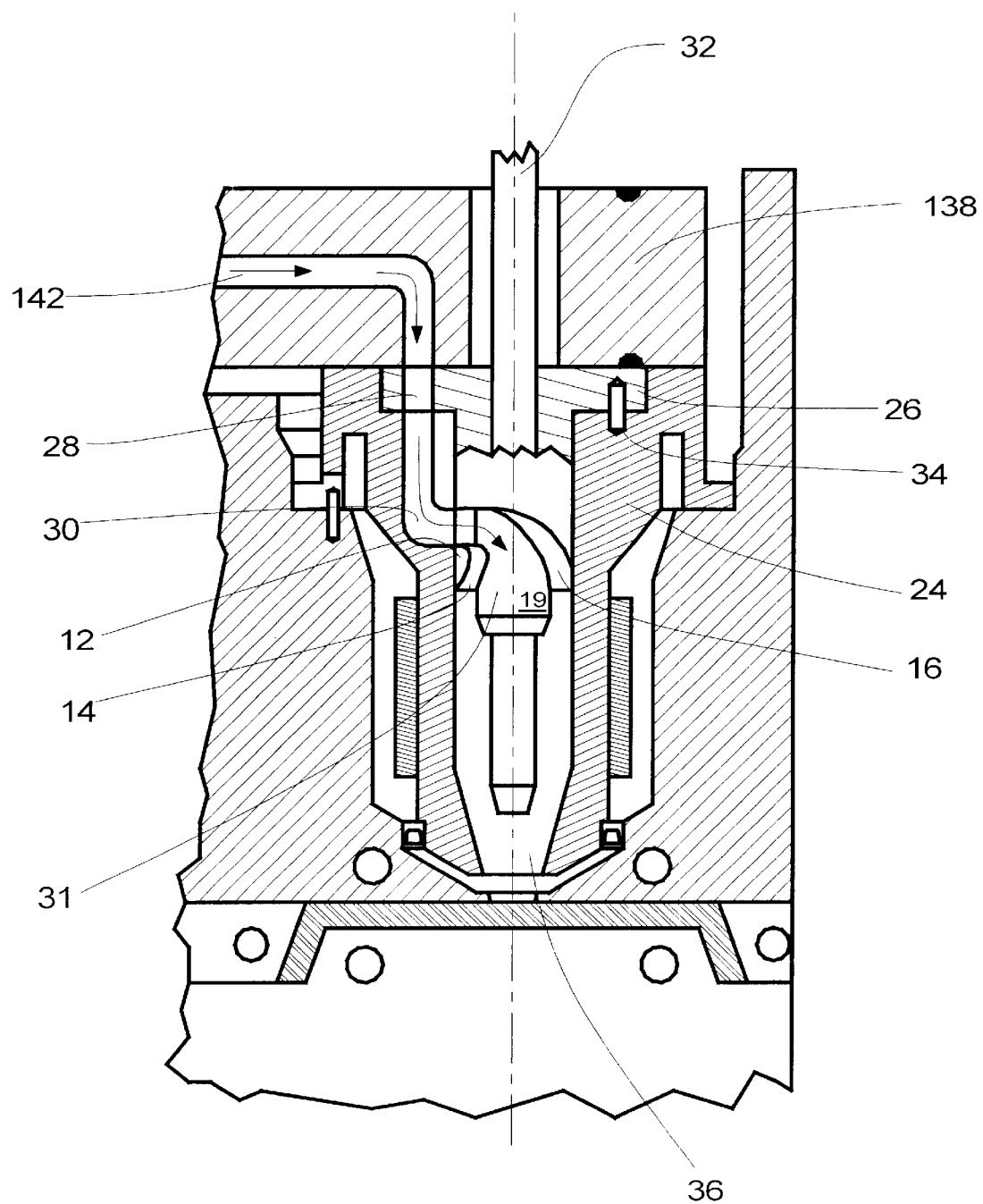
FIG. 4 is a sectional view of another preferred embodiment of the present invention comprising a valve-gated nozzle assembly.

Referring now to FIG. 4 (where like features have like numerals), another preferred embodiment in accordance with the present invention is generally shown. In this embodiment, the deflector body 26 is a singular bushing that is inserted in the nozzle body 24 for a single-melt nozzle.

Here again, the valve stem 32 is inserted through the deflector body 26, thereby supporting and guiding the valve stem 32 while also directing the melt around the back of the valve stem. Similar to the previous embodiments, melt flows from melt channel 142 through the first melt passage 28 which is located in the upper flange of the deflector body 26. Alignment between melt channel 142 and first melt passage 28 is maintained by locating pin 34. The melt then flows through second melt passage 30 which is located inside nozzle body 24.

The melt is then directed against deflector body 26 where the flow is diverted around to the back of the valve stem 32 by outside wall 16 and torpedo wall 14. The melt flow is diverted through the funnel channel 19 such that when it exits from the deflector body 26, it has been transformed from circular flow to uniform annular flow which exits nozzle outlet 36 to form a high quality, homogeneous molded part.

Figure 5:
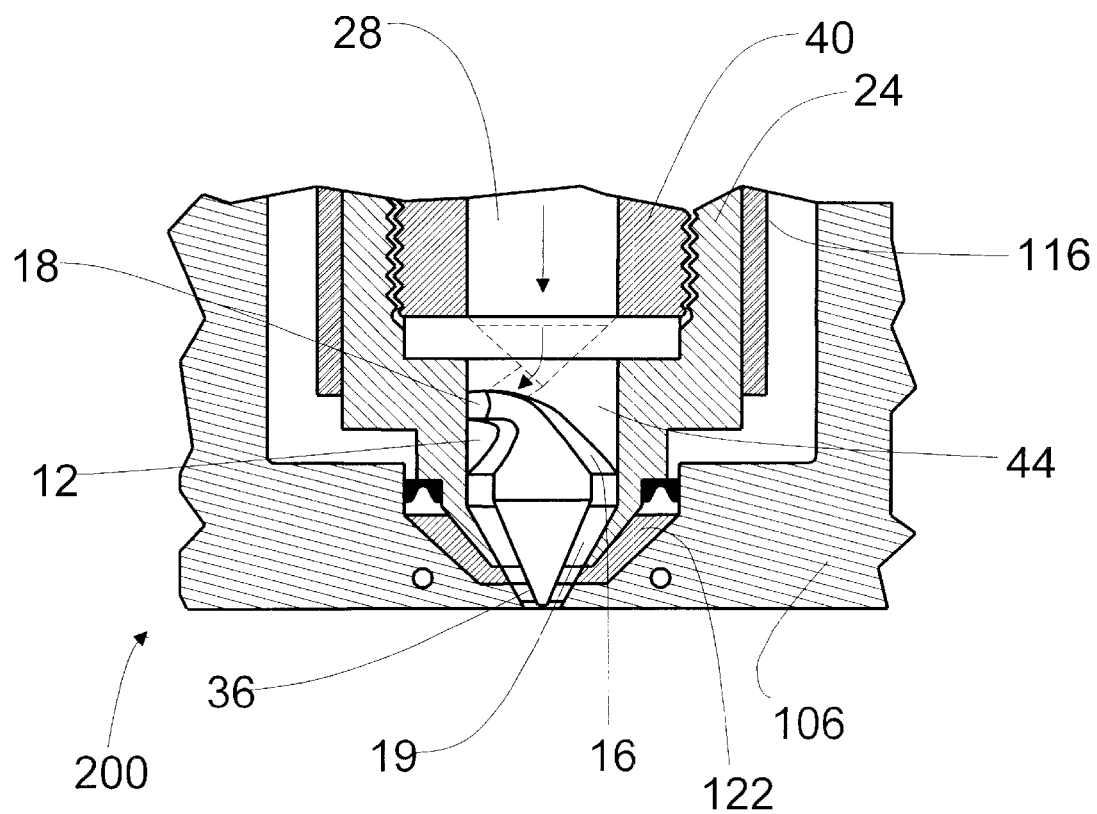
FIG. 5 is a sectional view of another preferred embodiment of the present invention comprising a nozzle tip assembly of a hot runner nozzle.
Figure 6:
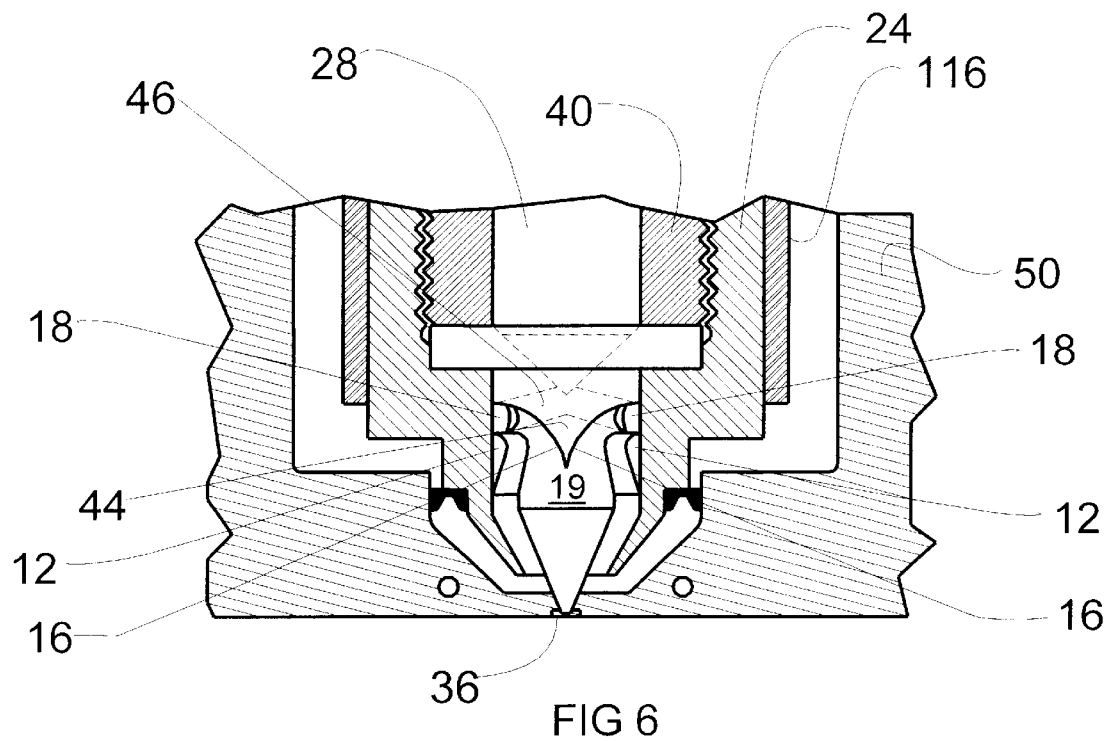
FIGS. 6 and 6a are sectional views of another preferred embodiment of the present invention comprising a nozzle tip with two melt flow inlets.
Figure 6A:
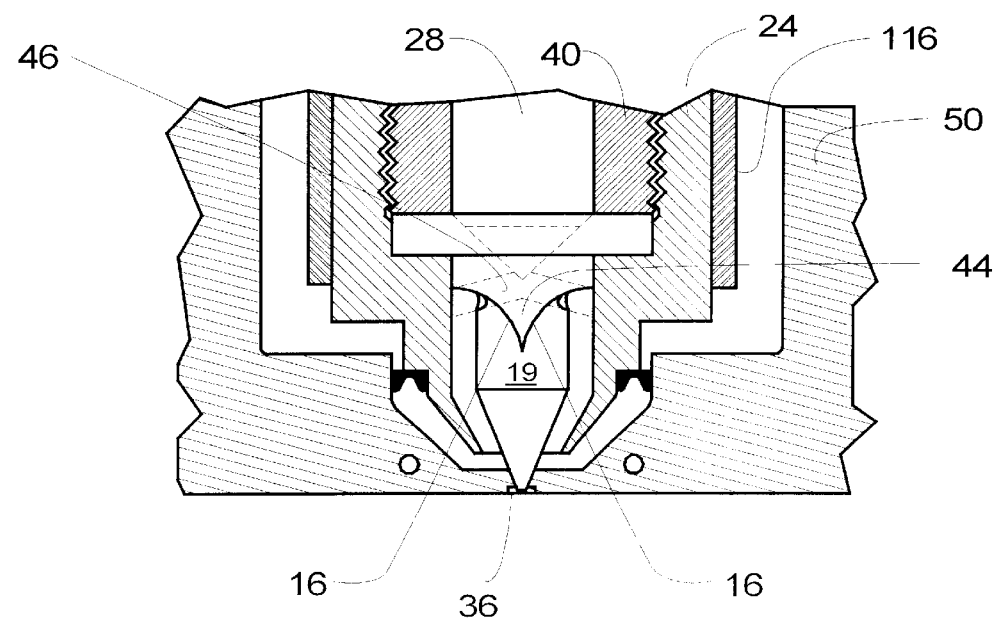
Figures 7, 8:
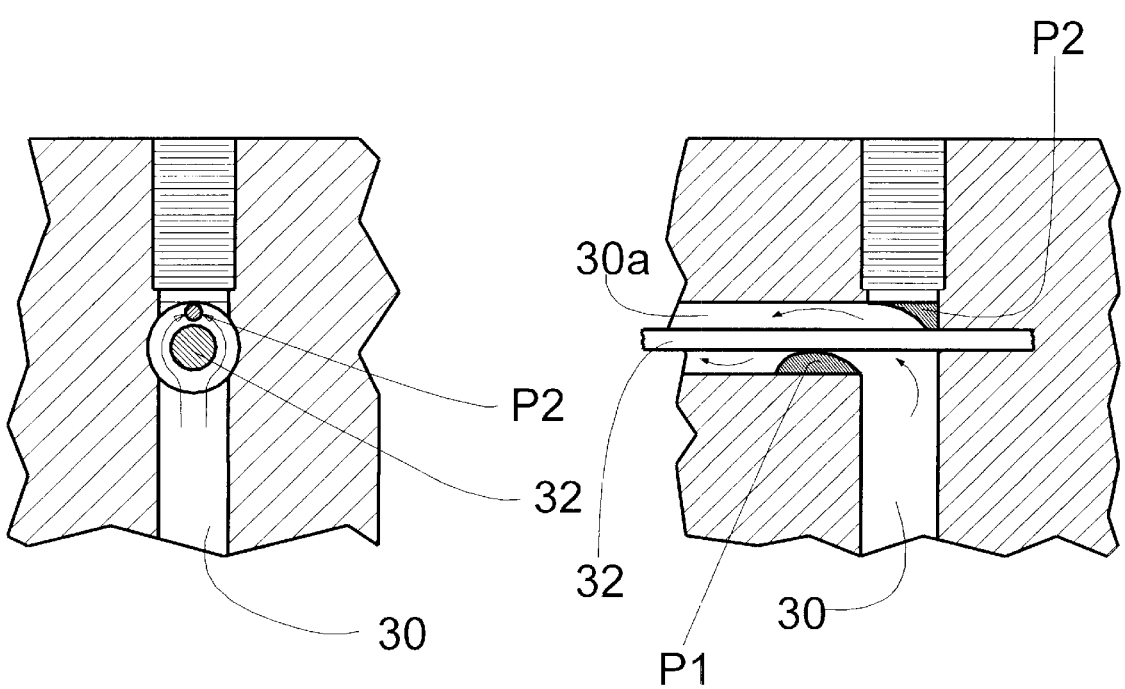
FIGS. 7 and 8 are sectional views of the prior art exhibiting stagnation points and non-uniform annular flow rates.

Referring now to FIGS. 5, 6 and 6a, (where like features have like numerals) another preferred embodiment of the present invention is shown comprising an injection molding nozzle tip assembly 200. In this embodiment, the principles of side fed mandrel dies previously discussed have been applied to the tip of an injection nozzle assembly. Commonly referred to as a "hot tip", this preferred embodiment comprises a nozzle without the valve stem as shown in the previous embodiments.

An elongated first melt passage 28 is located in a sleeve 40 for the communication of a melt to a tip 44. The sleeve 40 is rigidly affixed inside the nozzle body 24 and traps the tip 44 co-axially in the nozzle body 24. In the preferred embodiment, the sleeve is threaded into the nozzle body 24 and abuts against a top flange of tip 44. A heater 116 is wrapped around the outside of nozzle body 24 for maintaining the temperature of the melt as it flows through the nozzle assembly.

Melt flows through first melt passage 28 and is further communicated to flow inlet 18 through a tip passage 46. The flow is thus diverted around torpedo 12 and through funnel channel 19 as further defined by outside wall 16. In this arrangement, the melt flow exits nozzle outlet 36 as a uniform annular flow. Elimination of stagnation points behind the tip 44 is accomplished by forcing the melt to flow around to the back of the tip 44.

Referring to FIG. 6, a nozzle assembly similar to FIG. 5 is shown, except for the addition of a second tip passage 46 which communicates the melt flow to two sides of the tip 44. In addition, a second symmetrical torpedo 12 and outside wall 16 are provided to define a second funnel channel 19.

In FIG. 6a another preferred embodiment is shown which also has two tip passages 46 for the communication of a melt to tip 44. However, in this embodiment, the torpedo 12 has been removed. This arrangement may be advantageous for less demanding applications due to its lower cost to fabricate.

Figure 9:
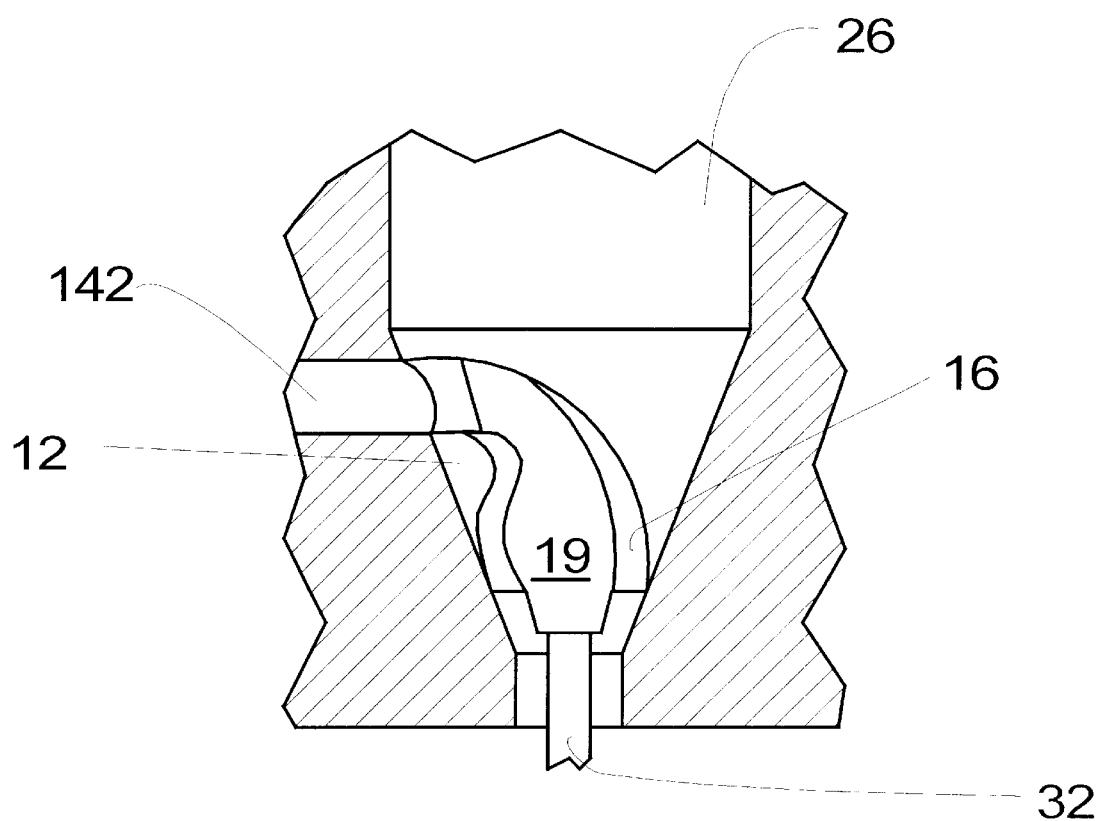
FIG. 9 is a partial sectional view of another preferred embodiment of the present invention comprising an injection nozzle assembly having a tapered surface.

Referring now to FIG. 9 (where like features have like numerals), another preferred embodiment of the present invention is shown which comprises a deflector body 26 which has a tapered flow surface. Side fed mandrel die principles have shown that a tapered flow surface, especially in the area of the funnel channel 19, helps to substantially reduce the pressure drop that occurs in the melt as it is diverted around a flow obstruction. Torpedo 12 and outside wall 16 are formed parallel to the tapered surface which comprises the funnel channel 19. The tapered deflector body 26 is inserted into a tapered receiving hole in the manifold 138, and alignment is maintained by the abutting tapered surfaces. A locating pin, similar to that shown in previous embodiments may also be used to further maintain the deflector body 26 alignment with the melt channel 142.

This tapered channel arrangement could also be utilized in the aforementioned embodiments. Specifically, the embodiments shown in FIGS. 2, 2b, 3, 4, 5, 6 and 6a could all incorporate the use of the tapered flow surface to reduce the melt pressure drop as it flows around obstacles.

While the previous embodiments all show the use of the torpedo 12 and outside wall 16 as part of a deflector body 26 that is wrapped around a valve stem 32, the torpedo 12 and outside wall 16 could easily be placed directly on the outside surface of the valve stem 32. A disadvantage to this approach however is the reduction in the valve stem support provided by the deflector housing that may lead to accelerated wear of the valve stem. In addition to this drawback, it would also be necessary to incorporate an alignment feature to maintain alignment of the valve stem with the manifold channel.

It is to be understood that the invention is not limited to the illustrations described herein, which are deemed to illustrate the best modes of carrying out the invention, and which are susceptible to modification of form, size, arrangement of parts and details of operation. The invention is intended to encompass all such modifications, which are within its spirit and scope as defined by the claims.

What is claimed is:

1. A flow deflector inserted into a nozzle body for an injection molding system having a hot runner manifold for the communication of a flowing medium to at least one nozzle assembly by at least one melt channel, said flow deflector comprising:
   a substantially cylindrical deflector body, the deflector body having a flow inlet, a flow outlet, and a diverter between the flow inlet and the flow outlet, the diverter characterized by
   a first smoothly curved wall extending around the cylindrical body and a single torpedo having a second wall spaced apart from the first wall, the first and second walls being substantially coextensive over a first portion of the diverter and diverging over a second portion of the diverter, the second portion providing an expanding funnel for discharging the flowing medium, wherein a surface of said torpedo is adjacent to an inner wall of said nozzle body.

2. The flow deflector of claim 1, further comprising a valve stem slidably inserted into the deflector body and operatively positioned to start and stop flow of the medium, and wherein the deflector body has an outside surface in which the diverter is formed.

3. The flow deflector of claim 2, wherein said deflector body is tapered.

4. A flow deflector in an injection molding system in which a molten medium flows, said flow deflector comprising:
   a deflector body having a flow inlet, a flow exit, a diverter between the inlet and the exit, the diverter comprising: two outside walls between the inlet and the outlet, and a torpedo having two symmetrical inside walls each spaced from each of the outside walls, thereby defining two symmetrical funnel channels,
   a valve stem slidably inserted into the deflector body and operatively positioned to start and stop flow of the medium, wherein the deflector body has an outside surface in which the diverter is formed, and
   an elongated nozzle body having a second melt passage and a third melt passage therein, the deflector body being disposed in the third melt passage and having a first melt passage in communication with the second melt passage, the second melt passage in communication with the flow inlet, the valve stem operatively extending through the deflector body to a nozzle outlet on the nozzle body.

5. The flow deflector of claim 4, further comprising a locating pin for maintaining alignment of the second melt passage to the first melt passage and the flow inlet.

6. The flow deflector of claim 4, wherein the deflector body has an additional first melt passage aligned with and in communication with an additional second melt passage in the nozzle body, an additional flow inlet on the outside surface communicating with the additional second melt passage, and an additional diverter between the additional inlet and the outlet.

7. The flow deflector of claim 6, further comprising a locating pin for maintaining alignment of the second melt passage to the first melt passages and the flow inlets.

8. A flow deflector in an injection molding system having a hot runner manifold for the communication of a flowing medium to at least one nozzle assembly by at least one melt channel, said flow deflector comprising:
   at least one deflector housing inserted into said manifold, said deflector housing having a flow inlet in alignment and communication with the melt channel, a flow exit communicating with the nozzle assembly, and a single diverter between the inlet and the exit, the diverter comprising:
   two outside walls between the inlet and the outlet and a torpedo having two symmetrical inside walls each spaced from each of the outside walls, thereby defining two symmetrical funnel channels.

9. The flow deflector of claim 8, further comprising:
   a valve stem operatively extending through the deflector housing to a nozzle outlet of the nozzle assembly, the valve stem controlling flow of said medium; and
   a piston head affixed to said valve stem for the movement of said valve stem to open and restrict said nozzle outlet.

10. The flow deflector of claim 9, wherein the deflector housing has an end which houses the piston head.

11. The flow deflector of claim 9, further comprising a locating pin for maintaining alignment of the melt channel with the flow inlet.

12. The flow deflector of claim 11, further comprising a spring means in communication with said nozzle assembly for urging said nozzle assembly against said manifold.

13. The flow deflector of claim 8, said torpedo is comprised of a tear shaped protrusion affixed to an outside surface of said deflector housing.

14. The flow deflector of claim 8, wherein said outside walls wrap around and down an outside surface of said deflector housing and meet at a point adjacent to the flow exit.

15. A nozzle assembly in an injection molding system, said nozzle assembly comprising:
- a nozzle body having a nozzle outlet and a first melt passage for transfer of a flowing medium to the nozzle outlet; and
- a nozzle tip disposed in the nozzle body adjacent the nozzle outlet, the tip having a tip passage aligned with and in communication with the first melt passage, an outer surface in which a flow inlet is formed communicating with the tip passage, a flow exit communicating with the nozzle outlet, two outside walls formed in the outer surface between the inlet and the outlet, and a torpedo having two inside walls each spaced from each of the outside walls, thereby defining two funnel channels between the inlet and the outlet; whereby a medium flowing through the nozzle assembly exhibits substantially uniform annular flow as it exits the nozzle outlet and wherein the nozzle tip has an additional tip passage aligned with and in communication with the first melt passage, an additional flow inlet on the outer surface of the tip and communicating with the tip passage, an additional two outside walls on the outer surface between the inlet and the outlet, and an additional torpedo having two inside walls each spaced from each of the outside walls, thereby defining two additional funnel channels between the inlet and the outlet.

16. The flow deflector of claim 1, wherein the torpedo comprises a tear-shaped protrusion affixed to an outside surface of the deflector body.

17. The flow deflector of claim 1, wherein said first smoothly curved wall wraps around and along an outside surface of the deflector body and extends to a point adjacent to the flow outlet.

* * * * *